United States Patent
Bawa et al.

(10) Patent No.: US 12,541,802 B2
(45) Date of Patent: Feb. 3, 2026

(54) SYSTEMS AND METHODS FOR DISTRIBUTED LEDGER-BASED AUDITING

(71) Applicant: JPMORGAN CHASE BANK, N.A., New York, NY (US)

(72) Inventors: Manuj Bawa, Clarksburg, MD (US); John S. Combs, Fallston, MD (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 575 days.

(21) Appl. No.: 17/494,817

(22) Filed: Oct. 5, 2021

(65) Prior Publication Data

US 2022/0108404 A1   Apr. 7, 2022

Related U.S. Application Data

(60) Provisional application No. 63/087,431, filed on Oct. 5, 2020.

(51) Int. Cl.
| | |
|---|---|
| G06Q 40/12 | (2023.01) |
| H04L 9/00 | (2022.01) |
| H04L 9/06 | (2006.01) |
| H04L 9/32 | (2006.01) |

(52) U.S. Cl.
CPC .......... *G06Q 40/12* (2013.12); *H04L 9/0643* (2013.01); *H04L 9/3239* (2013.01); *H04L 9/50* (2022.05)

(58) Field of Classification Search
CPC ......... G06Q 40/12; H04L 9/50; H04L 9/0643; H04L 9/3239
See application file for complete search history.

(56) References Cited

U.S. PATENT DOCUMENTS

| | | | |
|---|---|---|---|
| 10,616,324 B1 * | 4/2020 | Kaddoura | H04L 69/329 |
| 2019/0165943 A1 * | 5/2019 | Chari | H04L 9/3221 |
| 2019/0294141 A1 * | 9/2019 | Krauz | H04L 9/3234 |
| 2020/0089670 A1 * | 3/2020 | Padmanabhan | G06Q 20/3821 |
| 2020/0252221 A1 * | 8/2020 | Zamani | H04L 63/123 |
| 2020/0272619 A1 * | 8/2020 | Alferov | H04L 9/3297 |
| 2021/0089683 A1 * | 3/2021 | Hemlin Billstrom | H04L 9/3239 |
| 2021/0320799 A1 * | 10/2021 | Bankston | H04L 9/3239 |
| 2021/0326815 A1 * | 10/2021 | Brody | G06Q 20/389 |
| 2021/0377037 A1 * | 12/2021 | Antonopoulos | H04L 9/3247 |
| 2023/0004578 A1 * | 1/2023 | Harold | G06F 16/275 |
| 2023/0169154 A1 * | 6/2023 | Chua | G06Q 30/0185 726/26 |

* cited by examiner

*Primary Examiner* — Luu T Pham
*Assistant Examiner* — Paul J Skwierawski
(74) *Attorney, Agent, or Firm* — GREENBERG TRAURIG LLP

(57) ABSTRACT

A trusted node in a distributed ledger audit system may identify first audit event data for a first audit event from a first computing resource on a messaging bus; generate a first hash of a subset of the first audit event data; write the first audit event data to a storage location; create a first block comprising a subset of the first audit event data and a header comprising the first hash; and write the first block to a scoped distributed ledger. A verification node may generate a third hash from the first hash and a second hash for a second block for a second audit event; create a third block comprising the third hash in a header of the third block and the subset of first audit event data and the subset of second audit even data; and write the second block to an audit distributed ledger.

14 Claims, 3 Drawing Sheets

SYSTEMS AND METHODS FOR DISTRIBUTED LEDGER-BASED AUDITING

RELATED APPLICATIONS

This application claims priority to, and the benefit of, U.S. Provisional Patent Application Ser. No. 63/087,431, filed Oct. 5, 2020, the disclosure of which is hereby incorporated, by reference, in its entirety.

BACKGROUND OF THE INVENTION

1. Field of the Invention

Embodiments relate generally to systems and methods for distributed ledger-based auditing.

2. Description of the Related Art

Organizations spend countless hours responding to audits every year. The audits are conducted internally and by external vendors, and sometimes by SEC appointed parties.

Audits are a critical component of ensuring that systems within an organization are controlled, logged, and changes to the systems are tracked to authorized requests. Every audit requires systems to produce reports, for example, on: (1) who accessed the systems; (2) when did they access the system(s); (3) what change(s) were made; (4) were the changes authorized; (5) who approved the change(s); (6) were any anomalies in the system identified; (7) the chain of custody for the asset lifecycle events; and others. The list could go on, but at the heart of the problem, producing reports, requires resources and time (both at the application level as well as the systems authorizing the changes.

SUMMARY OF THE INVENTION

Systems and methods for distributed ledger-based auditing distributed ledger-based audit responses are disclosed. In one embodiment, a method for creating distributed ledger-based audit records, comprising: (1) identifying, by a trusted node in a distributed ledger audit system and on a message bus, first audit event data for a first audit event from a first computing resource of a plurality of computing resources; (2) generating, by the trusted node, a first hash of a subset of the first audit event data; (3) writing, by the trusted node, the first audit event data to a storage location; (4) creating, by the trusted node, a first block comprising a subset of the first audit event data and a header comprising the first hash; (5) writing, by the trusted node, the first block to a scoped distributed ledger; (6) generating, by a verification node in the distributed ledger audit system, a third hash from the first hash and a second hash in a header for a second block for a second audit event on the scoped distributed ledger, the second block comprising a subset of audit event data for the second audit event; (7) creating, by the verification node, a third block comprising the third hash in a header of the third block and the subset of first audit event data and the subset of second audit even data; and (8) writing, by the verification node, the second block to an audit distributed ledger.

In one embodiment, wherein the first audit event may include a hardware lifecycle event, a responsibility handoff, and/or an operational event.

In one embodiment, the plurality of computing resources may include a computer system, an application, and/or an electronic device that generates first audit event data.

In one embodiment, the first block may also include an identifier for the first computing resource.

In one embodiment, the first hash and the second hash may be SHA-256 hashes.

In one embodiment, the first hash and the second hash may be generated by a first smart contract.

In one embodiment, the third hash may be a Merkle tree hash.

In one embodiment, the third hash may be generated by a second smart contract.

According to another embodiment, a method for accessing distributed ledger-based audit records may include: (1) receiving, at an audit viewer computer program, an identifier for a computing resource; (2) identifying, by the audit viewer computer program, a first block in an audit distributed ledger comprising the identifier; (3) retrieving, by the audit viewer computer program, the first block from the audit distributed ledger; (4) retrieving, by the audit viewer computer program, a second block from a scoped distributed ledger using the identifier; (5) retrieving, by the audit viewer computer program, audit event data for an audit event stored in off-chain storage, wherein the second block comprises a location for the audit event data and a hash of a subset of the audit event data; (6) generating, by the audit viewer computer program, a root hash based on a subset of the audit event data and the hash in the second block; (7) verifying, by the audit viewer computer program, that the root hash matches a hash in the first block; and (8) displaying, by the audit viewer computer program, the audit event data and a chain of custody for the audit event data.

In one embodiment, the audit event may be a hardware lifecycle event, a responsibility handoff, and/or an operational event.

In one embodiment, the computing resource may include a computer system, an application, and/or an electronic device that generates first audit event data.

In one embodiment, the root hash may be further based on the identifier for the computing resource and an identifier for the scoped distributed ledger.

In one embodiment, the root hash may be generated by a first smart contract.

In one embodiment, the root hash may be a Merkle tree hash.

In one embodiment, the hash in the second block may be generated by a second smart contract.

According to another embodiment, a system may include: a plurality of computing resources, each of the plurality of computing resources generating audit event data for each of a plurality of audit events; a plurality of messaging busses, each of the messaging busses associated with one or more of the computing resources and configured to receive the audit event data; a plurality of trusted nodes, each trusted node associated with one of the plurality of messaging busses and configured to generated a hash of the audit event data; an off-chain storage location in communication with one or more of the plurality of trusted nodes and configured to receive the audit even data from the trusted nodes; a plurality of scoped disturbed ledgers, each scoped distributed ledger associated with one of the trusted nodes and configured to receive blocks from the trusted nodes, the blocks comprising hashes of a subset of the event data and an identifier for one of the computing resources; a plurality of validation nodes, each validation node associated with one of the trusted nodes and configured to generate a Merkel tree hash for a plurality of blocks on one of the scoped distributed ledgers; and an audit distributed ledger in communication with the validation nodes and configured to receive a block from one of the validation nodes comprising the Merkel tree hash.

In one embodiment, each of the plurality of scoped distributed ledgers may be associated with an application scope, a geographic scope, and/or a common infrastructure scope.

In one embodiment, the scoped distributed ledgers and the audit distributed leger may be private distributed ledgers.

In one embodiment, the system may further include an audit viewing computer program executed by an electronic device and in communication with the audit distributed ledger. The audit viewing computer program may be configured to receive an audit query comprising an audit identifier for one of the plurality of computing resource, retrieve audit event data for the audit identifier, verify a chain of custody of the retrieved audit event data, and present the retrieved audit event data and the chain of custody.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate generally to systems and methods for distributed ledger-based auditing.

Embodiments may provide the following:

Establish private distributed ledgers (e.g., Blockchains) for storing audits, changes and events;

The distributed ledgers may be separated by line of business, geography, applications, etc. at the lower levels, but aggregate up to higher level ledgers;

The distributed ledgers may include an immutable and cryptographically-verifiable record. Because of this, it is not necessary to prove the sanctity of audit events. This reduces the scope from trying to prove audits for databases, servers, apps, changes, incidents, etc. to a single distributed ledger;

Auditors may view the audit events via a user interface that provides visibility to distributed ledgers globally, to specific restricted countries (e.g., Luxembourg), etc.; and The risk of on who gets to modify/write/validate hashes to the distributed ledgers is reduced to a few trusted nodes.

In embodiments, the distributed ledgers may be based on distributed ledger/blockchain technology. In embodiments, a consensus algorithm operating on a plurality of distributed computer nodes may update the distributed ledger in which multiple copies of the distributed ledger exist across the plurality of distributed computer nodes. Information may be added to a block in the blockchain-based system according to the consensus algorithm.

Figure 1:
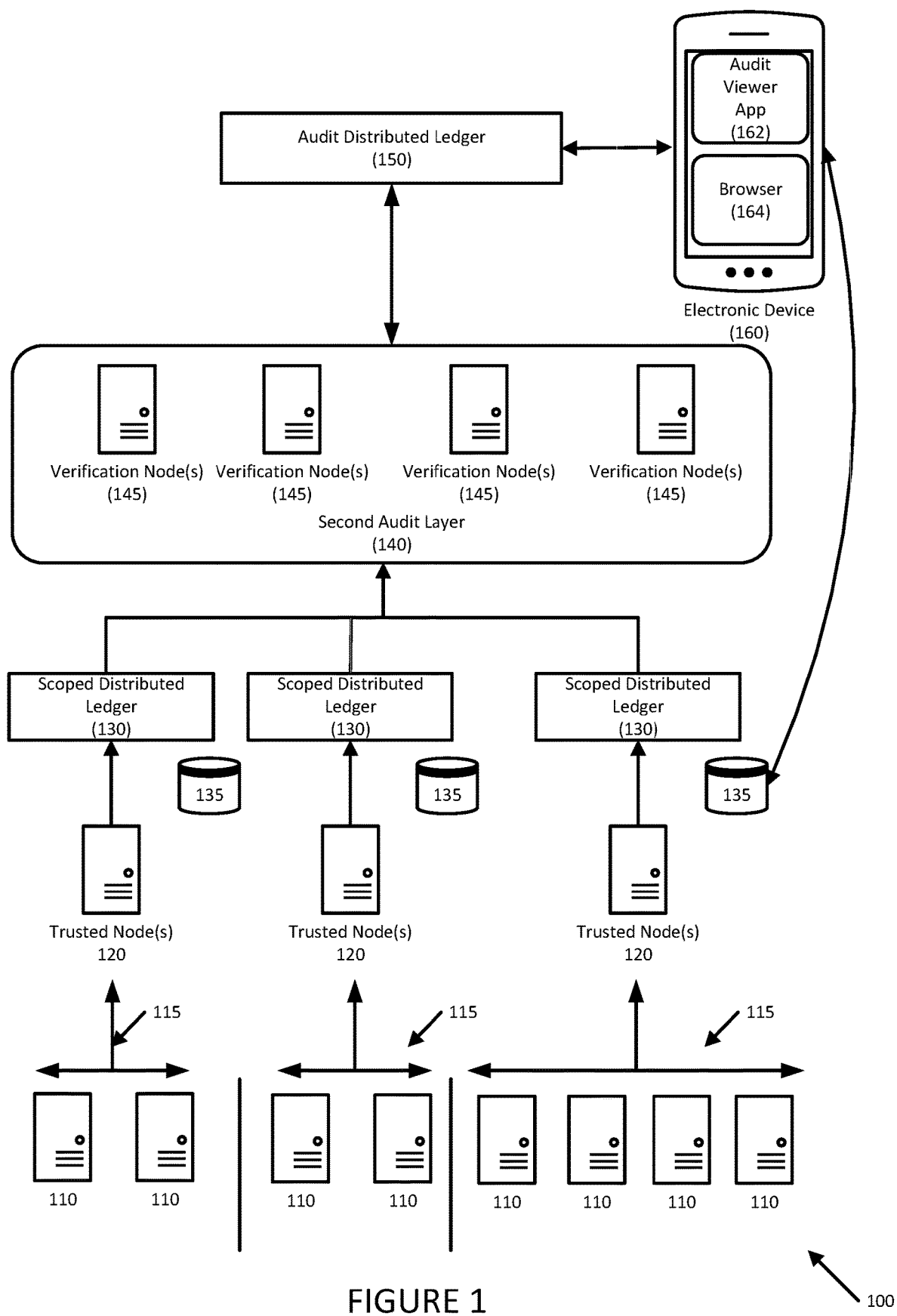
FIG. 1 depicts a system for distributed ledger-based auditing engine according to one embodiment.

Referring to FIG. 1, a system for distributed ledger-based auditing is provided according to an embodiment. System 100 may include a plurality of computing resources 110. Computing resources 110 may include any system, applica-tion, or device that may generate data that may be audited. Examples include applications, central systems, business unit systems, systems of records, HR systems, etc.

Computing resources may be physical resources, logical resources, combinations thereof, etc.

In one embodiment, a plurality of computing resources 110 may be grouped within the same geographical area, the same business unit, within the same application, within the same infrastructure, etc. Any suitable manner of grouping a plurality of computing resources 110 may be used as is necessary and/or desired.

Computing resources 110 may publish audit events to message bus 115. Examples of audit events include hardware lifecycle stages (e.g., commissioned, decommissioned, retried, repaired, discovered, etc.), team and operations responsibility handoffs, operational events (e.g., deployments, repaves, changes logged, incidents caused, requests on particular configuration items, etc.), etc. Each audit event may have a designated classification, with a published taxonomy of stages and operations.

Message bus 115 may be a common message bus to a plurality of computing resources 110 that may be grouped together, within the same area (e.g., within the same data center), etc. In one embodiment, computing resources 110 may publish audit events and may assign a unique identifier to the audit event.

In embodiments, computing resources 110 may publish the audit events to message bus 115 in real time. The respective computing resources 110 may further assign a unique messaging reference to the audit event, such as a resource identifier, etc.

System 100 may further include a plurality of trusted nodes 120. One or more trusted node 120 may be provided for each group of computing resources 110. Each trusted node 120 may read audit events from message busses 115, and may write the audit events to one of a plurality of scoped distributed ledgers 130. In one embodiment, scoped distributed ledgers 130 may be private ledgers, and may be associated with a business unit, an application, a geography, an infrastructure, etc. Thus, each scoped distributed ledger 130 may receive and record audit events generated by computing resources 110 within a particular scope.

Each trusted node 120 may extract and curate data points from audit events received via message bus 115 and may generate a hash, such as a one-way SHA-256 hash, of a subset of the data for the audit event. The hash may be based on key fields of the raw event, and may be generated using smart contracts for scoped distributed ledgers 130. Additional fields, such as an identify of the respective trusted node 120, time stamps, audit event type, source resource 110, etc. may be used to create the hashes. Examples of smart contracts may include change numbers, incident numbers, break glass request ids, deployments, etc., and a subset of data from the audit event that is enough to verify the audit event hash against the respective resource 110 may be used.

In one embodiment, the hashes may be stored in the header of a block written to scoped distributed ledger 120. The block may include limited data, such as a source resource 110, the unique identifier, etc.

In one embodiment, the audit event type and unique identifiers may be used by the smart contracts to generate hashes. The parameters remain the same, the values of the parameters change across different audit events.

While the full data around the audit event may be stored in off-chain storage 135, the data attributes included in the blocks on the distributed ledgers may sufficiently verify the integrity of the audit event.

Each trusted node 120 may generate a unique identifier for the hash. In one embodiment, the unique identifier may further include a composition of time since epoch, a type of event, a hardware or application logical identifier, an identifier for the source resource 110 it was detected from, raw field references to resource 110, etc.

System 100 may include off-chain storage 135, which may store additional data related to audit events. In one embodiment, each scoped distributed ledger 130 may be provided with one or more off-chain storage 135 locations. Off-chain storage 135 may be any suitable storage, including databases.

Second audit layer 140 may include a plurality of verification nodes 145. Each verification node 145 may read one or more scoped distributed ledger 130 and may periodically generate and write ledger hashes of scoped distributed ledgers 130 to audit ledger 150. For example, verification nodes 145 may generate hashes of the hashes on scoped distributed ledgers 130, thereby creating Merkle tree hashes that may be used to verify the chain of custody of the audit event. In one embodiment, the Merkle tree hashes may be generated periodically (e.g., weekly, daily, hourly, etc.), on demand, or as otherwise is necessary and/or desired.

To verify the chain of custody of an audit event, verification nodes 145 may create root hashes for the audit event. The root hashes may be used to track detailed audit event data stored off-chain by verification nodes 145 and may be visible in audit viewer application 162, browser 164, etc.

Audit ledger 150 may be a private ledger, and may be accessed via an application, such as audit viewer application 162, browser 164, etc. that may be executed on electronic device 160. Electronic device 160 may be any suitable computing device, including, for example, workstations, desktop computers, notebook computers, tablet computers, smart devices, Internet of Things ("IoT") devices, etc. Application 162, and/or browser 164 may provide audit verification services, audit reporting services, and audit viewing services. Any other suitable services may be provided as is necessary and/or desired.

In one embodiment, the audit may be focused on a line of business, a system, and application, a geography, an infrastructure, etc.

In embodiments, application 162, and/or browser 164 may not access on-chain data below scoped distributed ledgers 130. Off-chain reference data may be retrieved from off-chain storage 135 to view details around the audit event that are not included on the distributed ledgers.

By providing audit distributed ledger 150, auditors may access ledger hashes more quickly and efficiently. Auditors may be provided with a single view of the chain of custody for an asset from cradle to grave, including all the changes, incidents and audit events that occurred through its lifecycle. Auditors may further be provided with any SEC reportable incidents, occurrences of anomalies, deployments of code, OS upgrades, break glass requests, outages that the asset might have incurred, etc.

Figure 2:
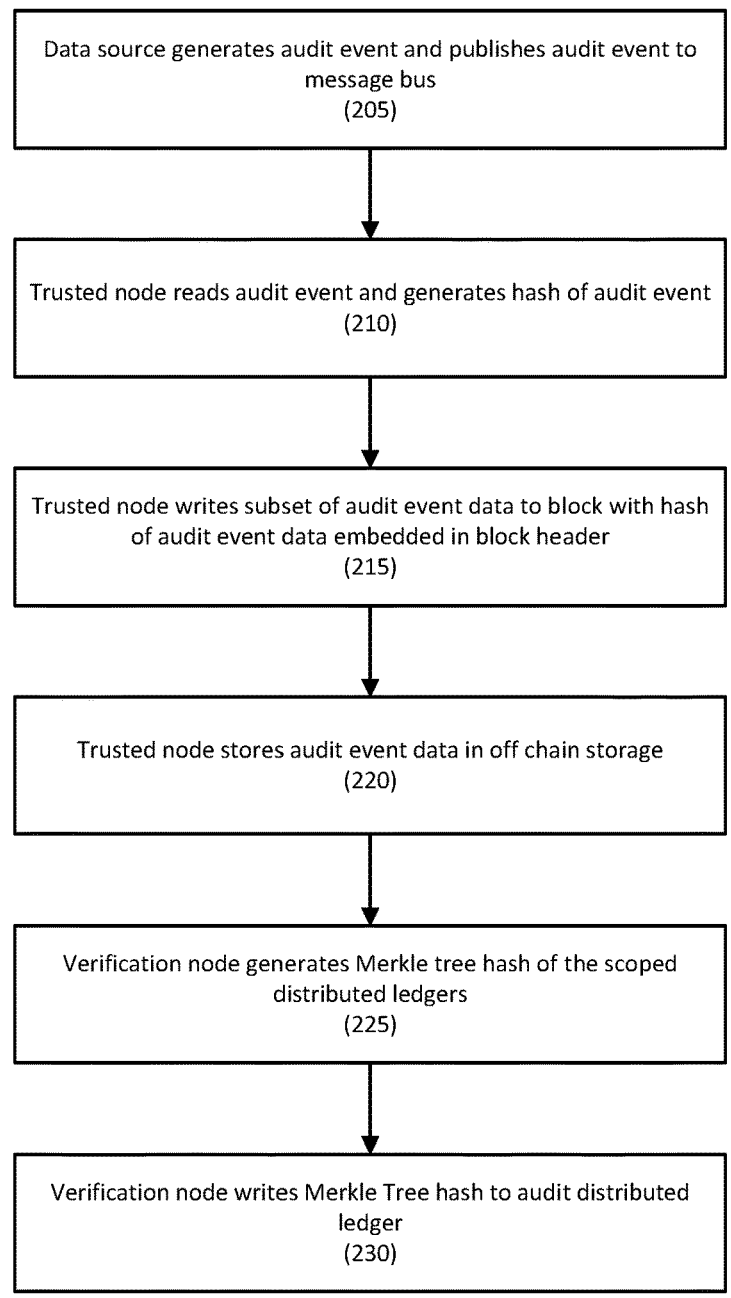
FIG. 2 depicts a method for creating distributed ledger-based audit records according to an embodiment.

Referring to FIG. 2, a method for creating distributed ledger-based audit records is provided according to an embodiment.

In step 205, a plurality of resources, such as servers, apps, systems, infrastructure, etc., may publish audit events to message busses. Examples of audit events include SEC reportable incidents, occurrences of anomalies, deployments of code, OS upgrades, break glass requests, outages that the asset might have incurred, hardware lifecycle stages, team and operations responsibility handoffs, operate events, etc.

In one embodiment, the resources may publish the audit events to the message bus with a unique identifier, such as an identifier for the source resource.

In step 210, a trusted node may read an audit event on the message buss and may generate a hash of the audit event to be written on an appropriate distributed ledger, such as a scoped distributed ledger that is associated with the data source. The scoped distributed ledgers may be based on a business unit, an application scope, a geographic region, a common infrastructure, etc. In one embodiment, the scoped distributed ledgers may be private.

In step 215, the trusted node may write a subset of the audit event details to a block on the scoped distributed ledger. The trusted node may embed the hash in the block. Additional fields, such as an identity of the respective trusted node, time stamps, type of events, source system, etc. may be used to create the hashes.

In step 220, the trusted node may write additional audit event details to off-chain storage. In one embodiment, the trusted node may include the location of the audit data in the block written to the scoped distributed ledger.

In step 225, periodically or as otherwise necessary and/or desired, the verification nodes may generate hashes of each of its scoped distributed ledgers. In one embodiment, the hashes may be generated periodically (e.g., weekly, daily, hourly, etc.), on demand, etc. The hash may be a Merkle tree hash that may be used to verify the chain of custody of the audit event. The verification nodes may generate hashes and verify audit events continuously and in real-time.

In one embodiment, the verification nodes may generate the Merkle tree hashes continuously and in real-time.

During verification, the verification nodes may verify the hash of the audit event, may verify audit event data with audit event data stored in off-chain storage. The verification node may generate a root Merkle tree hash that combines the hash of the audit event with one or more parameter from the off-chain resource to verify the chain of custody of the audit event.

In step 230, one or more verification nodes may publish the Merkle tree hashes to an audit distributed ledger. In one embodiment, the Merkle tree hashes may be in the header of the block, and the block may contain subsets of audit event data for a plurality of audit events.

The audit distributed ledger may be a private ledger.

Figure 3:
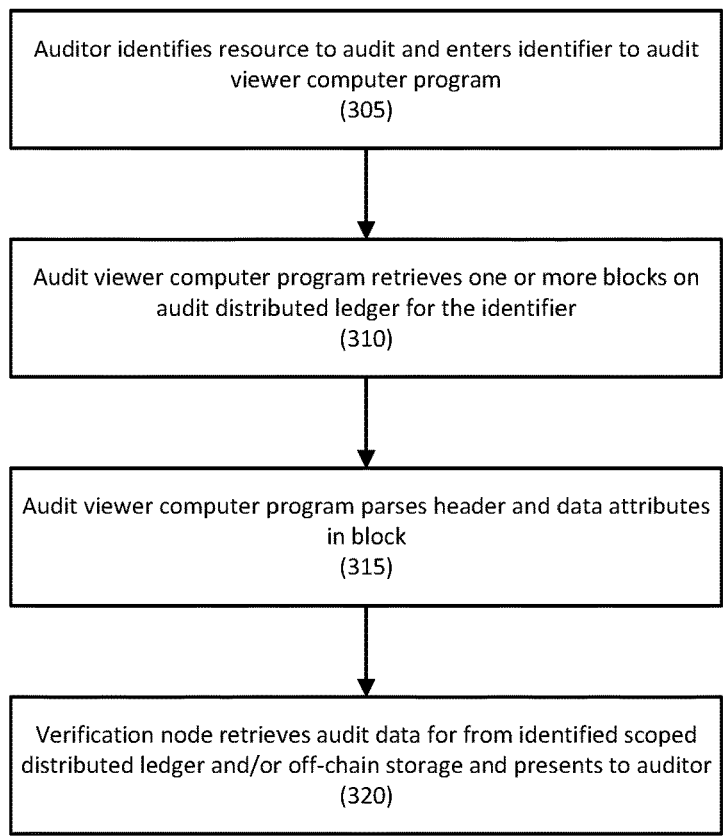
FIG. 3 depicts a method for distributed ledger-based auditing engine according to one embodiment.

Referring to FIG. 3, a method for distributed ledger-based auditing engine is provided according to one embodiment.

In step 305, an auditor, which may be an internal auditor or an external auditor, may identity a resource to audit. In one embodiment, the auditor may provide an identifier for the resource to an audit viewer computer program. Other identifiers may be received as is necessary and/or desired. The audit viewer may be a computer program or application executed on any suitable electronic device.

In step 310, using the identifier, the audit viewer computer program may retrieve one or more blocks in the audit distributed ledger that are associated with the identifier.

In step 315, the audit viewer computer program may parse the header and data attributes embedded in the block. In one embodiment, the audit viewer computer program may parse the Merkle hash from the header for the block. The data attributes may contain references to the off-chain data store. The audit viewer computer program may execute the same smart contracts used to generate a root hash using the same parameter used to generate the Merkle tree hash and may verify that the parameters retrieved from the off-chain store matches the Merkle tree hashes generated through the journey of audit events.

In another embodiment, the audit viewer computer program may have the verification node generate the root hash.

In step 320, the audit viewer computer program may receive audit event data from the scoped distributed ledger and/or off-chain storage, and may present the data to the auditor. For example, the audit viewer computer program may display data from the ledgers along with the raw audit event data from off-chain storage, and may deconstruct data attributes from the respective trusted node, scoped distributed ledger, and verification node. The audit viewer computer program may verify the data attributes to provide the chain of custody view to the user.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

identifying, by a trusted node in a distributed ledger audit system and on a message bus that interfaces with a plurality of computing resources that generate audit events, first audit event data for a first audit event published by a first computing resource of the plurality of computing resources, wherein the first audit event comprises a hardware lifecycle event and the first audit event data comprises a unique identifier for the first computing resource;

generating, by the trusted node, a first hash of a subset of the first audit event data;

creating, by the trusted node, a first block comprising the subset of the first audit event data and a header comprising the first hash, wherein the first block further comprises an identifier for the first computing resource;

writing, by the trusted node, the first block to a first scoped distributed ledger, wherein the first scoped distributed ledger is a private ledger and is associated with infrastructure associated with the first audit event;

writing, by the trusted node, a location of the first audit event data on the first scoped distributed ledger to an off-chain storage location;

periodically generating, by a verification node in the distributed ledger audit system, a Merkle tree hash of each of a plurality of scoped distributed ledgers including the first scoped distributed ledger, that are associated with the verification node;

verifying, by the verification node, the first audit event data by comparing the first audit event data to the first audit event data written to the off-chain storage location;

creating, by the verification node, a third block comprising the Merkle tree hash for the first scoped distributed ledger in a header of the third block and the subset of the first audit event data and a subset of second audit event data in a second block on the first scoped distributed ledger; and writing, by the verification node, the third block to an audit distributed ledger.

2. The method of claim 1, wherein the plurality of computing resources comprises a computer system, an application, and/or an electronic device that generates first audit event data.

3. The method of claim 1, wherein the first hash comprises a SHA-256 hash.

4. The method of claim 1, wherein the first hash is generated by a first smart contract.

5. The method of claim 1, wherein the Merkle tree hash is generated by a second smart contract.

6. A system comprising:
a plurality of computing resources;
a plurality of messaging busses, each of the messaging busses interfacing with the plurality of computing resources;
a plurality of trusted nodes, each trusted node associated with one of the plurality of messaging busses;
an off-chain storage location in communication with one or more of the plurality of trusted nodes;
a plurality of scoped disturbed ledgers, each scoped distributed ledger associated with one of the trusted nodes, wherein each of the scoped distributed ledgers is a private ledger and is associated with infrastructure associated with a first audit event;
a plurality of verification nodes, each verification node associated with one of the trusted nodes and with a subset of the plurality of the scoped distributed ledgers; and
an audit distributed ledger in communication with the verification nodes;
wherein:
one of the trusted nodes is configured to receive first audit event data for a first audit event published by a first computing resource of the plurality of computing resources, wherein the first audit event comprises a hardware lifecycle event and the first audit event data comprises a unique identifier for the first computing resource;
the trusted node is configured to generate a first hash of a subset of the first audit event data;
the trusted node is configured to create a first block comprising the subset of the first audit event data and a header comprising the first hash, wherein the first block further comprises an identifier for the first computing resource;
the trusted node is configured to write the first block to a first scoped distribute ledger of the plurality of scoped distributed ledgers;
the trusted node is configured to write a location of the first audit event data on the scoped distributed ledger to the off-chain storage location;
the verification node is configured to periodically generate a Merkle tree hash of each of a plurality of scoped distributed ledgers including the first scoped distributed ledger, that are associated with the verification node;
the verification node is configured to verify the first audit event data by comparing the first audit event data to the first audit event data written to the off-chain storage location;
the verification node is configured to create a third block comprising the Merkle tree hash for the first scoped distributed ledger in a header of the third block and the subset of the first audit event data and a subset of second audit event data in a second block on the first scoped distributed ledger; and the verification node is configured to write the third block to the audit distributed ledger.

7. The system of claim 6, wherein the audit distributed ledger is a private distributed ledger.

8. The system of claim 6, further comprising:
an audit viewing computer program executed by an electronic device and in communication with the audit distributed ledger.

9. The system of claim 8, wherein the audit viewing computer program is configured to receive an audit query comprising an audit identifier for one of the plurality of computing resource, retrieve audit event data for the audit identifier, verify a chain of custody of the retrieved audit event data, and present the retrieved audit event data and the chain of custody.

10. A non-transitory computer readable storage medium, including instructions stored thereon, which when read and executed by one or more computer processors, cause the one or more computer processors to perform steps comprising:
identifying on a message bus that interfaces with a plurality of computing resources that generate audit events, first audit event data for a first audit event published by a first computing resource of the plurality of computing resources, wherein the first audit event comprises a hardware lifecycle event and the first audit event data comprises a unique identifier for the first computing resource;
generating a first hash of a subset of the first audit event data;
creating, a first block comprising the subset of the first audit event data and a header comprising the first hash, wherein the first block further comprises an identifier for the first computing resource;
writing the first block to a first scoped distributed ledger, wherein the first scoped distributed ledger is a private ledger and is associated with infrastructure associated with the first audit event;
writing a location of the first audit event data on the first scoped distributed ledger to an off-chain storage location;
periodically generating a Merkle tree hash of each of a plurality of scoped distributed ledgers including the first scoped distributed ledger, that are associated with a verification node;
verifying the first audit event data by comparing the first audit event data to the first audit event data written to the off-chain storage location;
creating a third block comprising Merkle tree hash for the first scoped distributed ledger in a header of the third block and the subset of first audit event data and the subset of the first audit event data and a subset of second audit event data in a second block on the first scoped distributed ledger; and
writing the third block to an audit distributed ledger.

11. The non-transitory computer readable storage medium of claim 10, wherein the plurality of computing resources comprises a computer system, an application, and/or an electronic device that generates first audit event data.

12. The non-transitory computer readable storage medium of claim 10, wherein the first hash comprises a SHA-256 hash.

13. The non-transitory computer readable storage medium of claim 10, wherein the first hash is generated by a first smart contract.

14. The non-transitory computer readable storage medium of claim 10, wherein the Merkle tree hash is generated by a second smart contract.

\* \* \* \* \*